US005793605A

United States Patent [19]

Sellers

[11] Patent Number: 5,793,605
[45] Date of Patent: Aug. 11, 1998

[54] COLLAPSIBLE PORTABLE COMPUTER KEYBOARD WITH RESILIENT PRELOAD KEY STABILIZATION

[75] Inventor: Charles A. Sellers, Houston, Tex.

[73] Assignee: Compaq Computer Corporation, Houston, Tex.

[21] Appl. No.: 831,133

[22] Filed: Apr. 1, 1997

[51] Int. Cl.$^6$ .............................. G06F 1/16; B41J 11/56; H05K 7/04

[52] U.S. Cl. .......................... 361/680; 400/490; 400/682; 200/344; 200/345

[58] Field of Search ................... 361/680; 400/490–492, 400/682; 200/54, 344, 345; 364/708.1; 341/22; 235/1 D, 145 R, 146

[56] References Cited

U.S. PATENT DOCUMENTS

| | | | |
|---|---|---|---|
| 5,481,074 | 1/1996 | English | 200/5 A |
| 5,532,904 | 7/1996 | Sellers | 361/680 |
| 5,602,715 | 2/1997 | Lempicki et al. | 361/680 |
| 5,621,610 | 4/1997 | Moore et al. | 361/680 |

Primary Examiner—Lynn D. Feild
Attorney, Agent, or Firm—Konneker & Smith, P.C.

[57] ABSTRACT

A notebook computer is provided with a collapsible keyboard structure having keys supported on scissored linkage arm assemblies. In response to closing of the computer lid, key return spring portions of the keyboard are shifted away from their normal underlying relationships with the keys, and the scissored linkage arm assemblies and keys are forcibly retracted to storage and transport orientations. When the lid is subsequently opened, the key return spring portions, and a specially designed key preload member, are shifted relative to the retracted keys through an elevation stroke. During an initial portion of the elevation stroke, the key return spring portions engage the retracted keys and move them to extended positions in which the spring portions underlie the extended keys. In response to completion of the elevation stroke, the key preload member engages the extended keys and partially retracts them to a resiliently preloaded operating positions in which they partially compress their underlying spring members which substantially preclude the keys from wobbling and rattling in their ready-to-use operating positions.

28 Claims, 4 Drawing Sheets

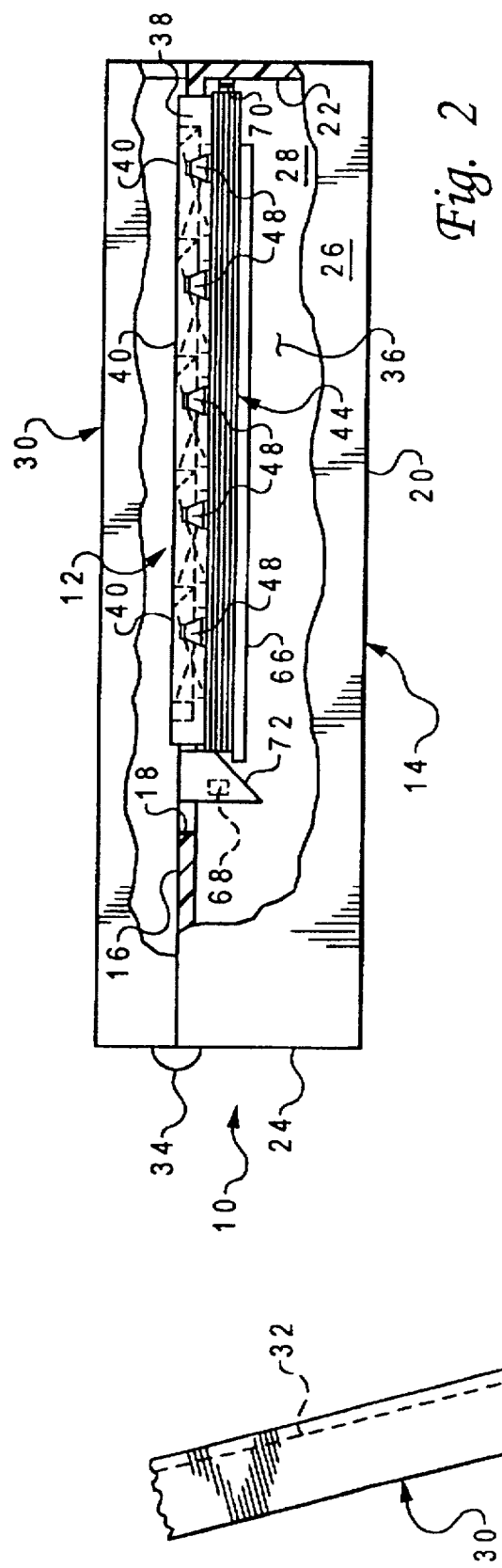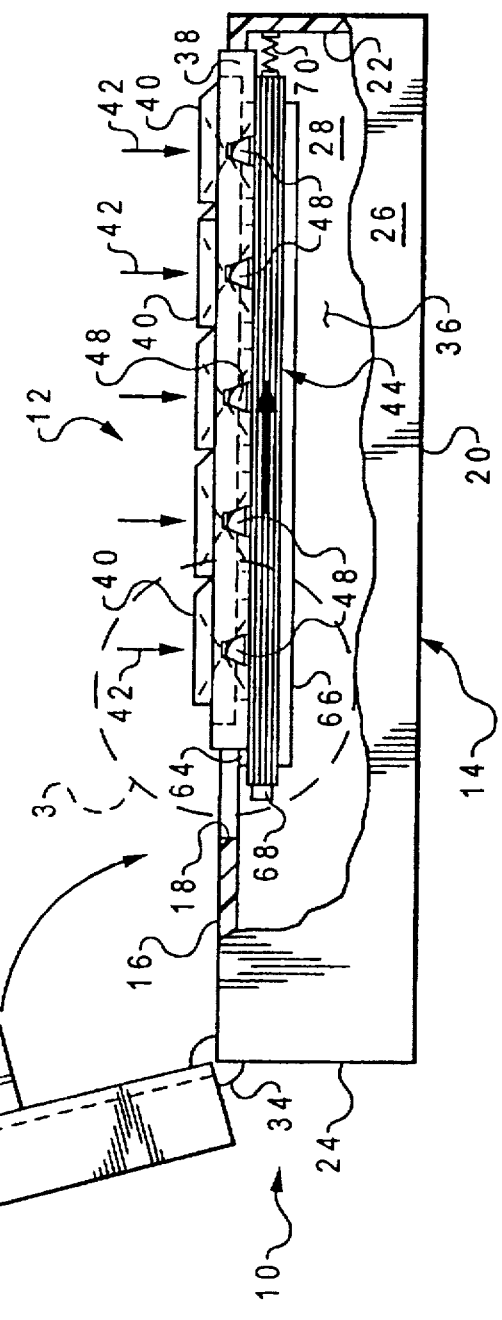

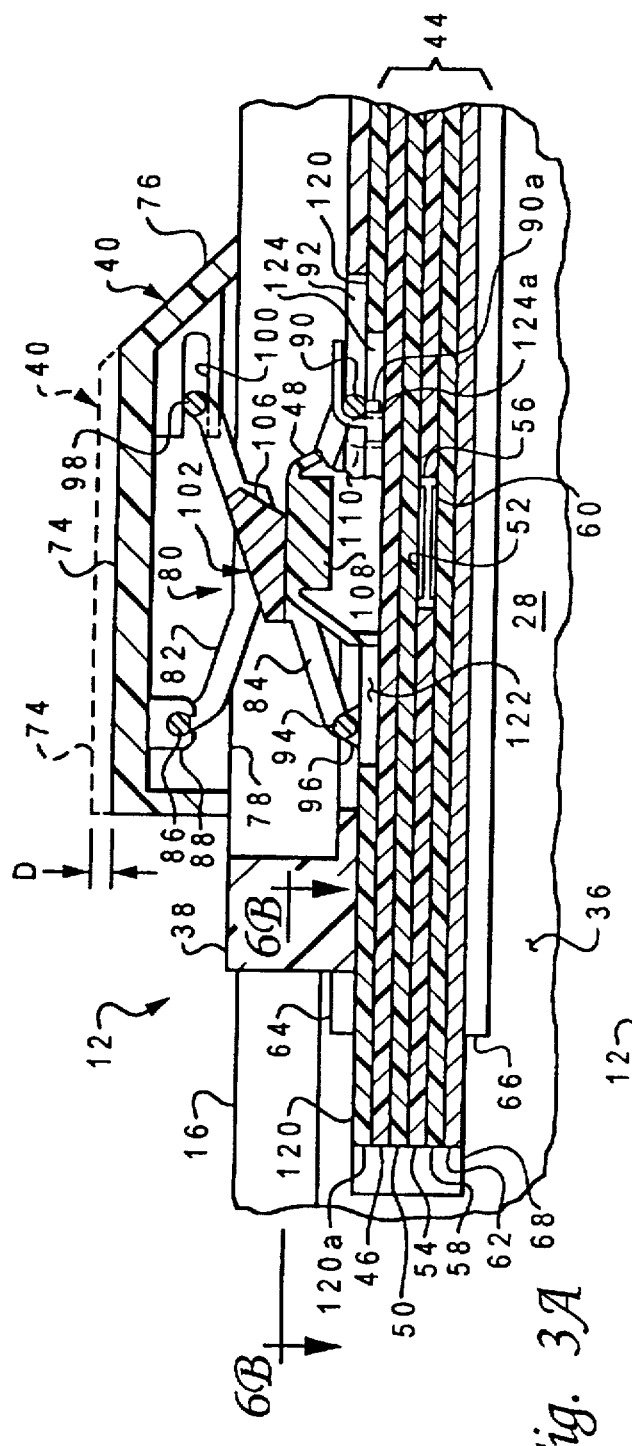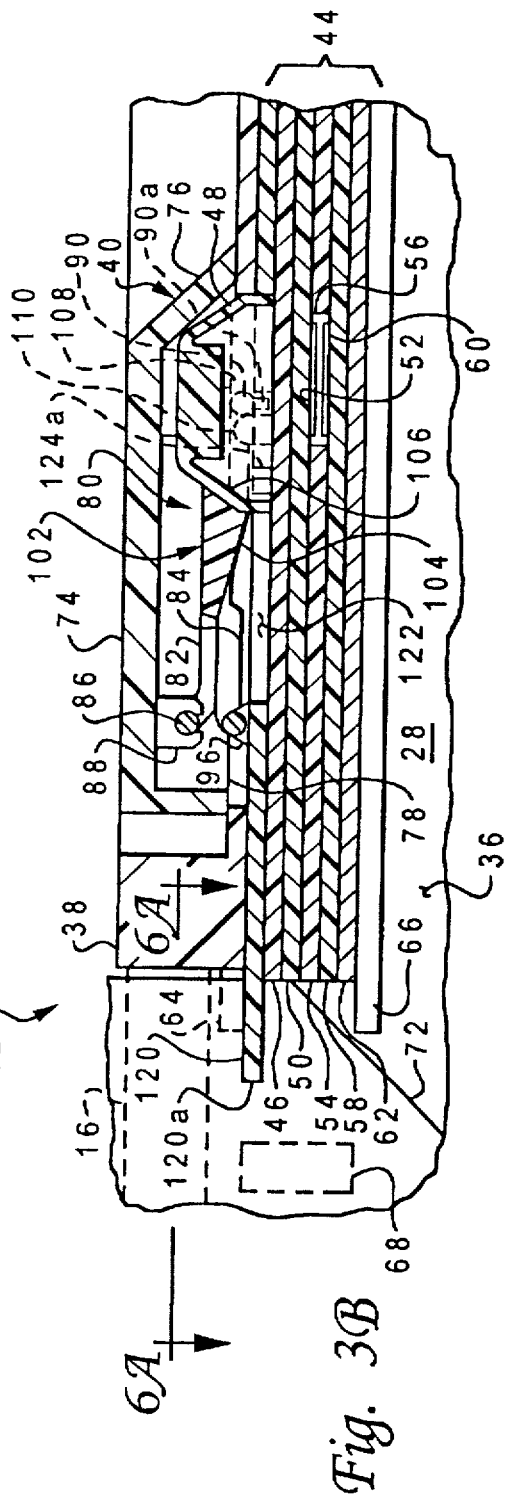

COLLAPSIBLE PORTABLE COMPUTER KEYBOARD WITH RESILIENT PRELOAD KEY STABILIZATION

BACKGROUND OF THE INVENTION

1. Field of the Invention

The present invention generally relates to electronic apparatus and, in a preferred embodiment thereof, more particularly relates to keyboard structures for portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many instances, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

Illustrated and described in U.S. Pat. No. 5,532,904 to Sellers and U.S. Pat. No. 5,602,715 to Lempicki et al are notebook computers which provide a useful thickness reduction in the closed computer without a corresponding reduction in the operative keystroke distance of the keyboard. This very desirable thickness reduction is achieved in the notebook computers illustrated and described in these two patents by providing the computers with collapsible keyboards.

The keys in these collapsible keyboards are supported on scissored linkage arm assemblies. In response to closing of the computer housing lid, resilient key return dome portions of the keyboard are shifted away from their normal underlying relationships with the keys, and the scissored linkage arm assemblies and keys are forcibly retracted to a storage and transport orientation in which the overall thickness of the keyboard structure is reduced by an amount essentially equal to the stroke distance of the keys. When the lid is subsequently opened, the key return domes are horizontally shifted back to their normal underlying relationships with the keys, and the keys and scissored linkage arm assemblies are forced outwardly by the return spring portions to their operating orientations above the resilient key return domes.

The key return domes are carried on the top side of a dome sheet which underlies a monoblock structure upon which the keys are movably supported by their scissored linkage arm assemblies, with the dome sheet defining the top layer of a multi-layer signal pad structure. The dome sheet, either by itself or with the balance of the signal pad structure, is shifted along the underside of the monoblock structure to cause the domes to cammingly engage portions of the scissored linkage arm assemblies and elevate the keys from their retracted storage and transport positions to their extended operating positions.

In noncollapsible portable computer keyboards it is a common practice to maintain a resilient preload force on the keys, urging them outwardly toward their extended ready-to-use positions and thereby essentially preventing the keys from wobbling and rattling in such positions when the keyboard is moved or the keys are being manipulated by a user of the computer. This key preload force is achieved by maintaining an interference fit between each key member and its associated underlying key return spring member such that with the key member in its extended ready-to-use position the key member slightly compresses its underlying return spring member.

To reduce potential key wobble and rattling in the collapsible keyboards shown in the aforementioned U.S. Pat. Nos. 5,532,904 and 5,602,715, it would be desirable to incorporate this resilient key preload into the keyboards when their keys were in their extended ready to-use orientations. However, to achieve this key preloading simply by vertically sizing the return domes so that the domes are partially compressed by the key structures in their outermost extended positions could potentially increase the frictional forces on the dome sheet and/or the overall multi-layer signal pad structure, during both elevation and collapsing of the keys, to an extent that could substantially reduce the service life and reliability of the collapsible keyboard.

As can be readily appreciated from the foregoing, it would be desirable to incorporate a resilient key preload force in a collapsible keyboard structure of the general type described above in a manner at least substantially reducing the friction forces on the shifting apparatus used to effect the elevation and retraction of the key structures. It is accordingly an object of the present invention to so incorporate a resilient key preload force in this general type of collapsible keyboard.

SUMMARY OF THE INVENTION

In carrying out principles of the present invention, in accordance with a preferred embodiment thereof, a portable computer, representatively a notebook computer, is provided with a specially designed collapsible keyboard in which the keys in their raised operating orientation are provided with a resilient preload force that substantially prevents them from rattling or wobbling during use.

The portable computer includes a base housing on which the collapsible keyboard is carried, and preferably includes a lid housing pivotally secured to the base housing, and the collapsible keyboard includes a support structure, and a series of key structures carried on the support structure for movement relative thereto between extended and retracted positions. Representatively the key structures include depressible key cap members movable carried on the support structure by scissored linkage assemblies.

The collapsible keyboard also includes a key shifting and preload structure which is operative, preferably in response to opening of the computer lid, to move the key structures from their retracted positions to their extended positions; partially retract the key structures from their extended positions to operating positions from which the key structures may be manually depressed to their retracted positions; restrain the partially retracted key structures against movement thereof to their extended positions; and exert on the restrained key structures a preload force resiliently urging them toward their extended positions.

In a preferred embodiment of the collapsible keyboard, a shifting member is carried beneath the support structure and has a spaced plurality of resilient key return members thereon. Preferably, the shifting member is a dome sheet and the resilient key return members are elastomeric dome members. The support structure, representatively a monoblock structure, and the shifting member are shiftable relative to one another through an elevation stroke, preferably in response to opening the computer lid. During an initial portion of the elevation stroke the domes are cammed under the key structures and raise them from their retracted positions to their fully elevated positions without appreciably compressing the underlying dome members.

During a final portion of the elevation stroke, preferably effected by shifting the dome sheet relative to the overlying key support structure a preload member, representatively a preload sheet member slidably sandwiched between the dome sheet and the support structure is responsively moved relative to the dome sheet through a preload stroke in a direction opposite to that of the elevation stroke of the dome sheet. Preferably, the domes project upwardly through first openings in the preload sheet, and portions of the scissor linkage portions of the key structures project downwardly through second openings in the preload sheet.

During the preload stroke, edge portions of the second openings forcibly engage the scissor linkages in a manner causing them to partially retract the extended key structures to thereby partially retract them to operating positions in which they slightly compress the underlying elastomeric domes and thus maintain a resilient preload force on the key structures. Thus, additional sliding frictional force on the dome sheet occasioned by the creation of this desirable key preload force occurs only during a terminal portion of the elevation stroke of the dome sheet, similarly, when the dome sheet is shifted in an opposite direction through a key retraction stroke, this additional preload sliding frictional force on the dome sheet exists only during an initial portion of such retraction force.

Cooperating means are preferably provided on the dome sheet and preload sheet and are operative to create a mechanically advantaged shifting force on the preload sheet in response to movement of the dome sheet through a final portion of its elevation stroke. These cooperating means representatively include a lever member pivotally secured to the preload sheet and operatively engageable by the dome sheet during a final portion of its elevation stroke.

BRIEF DESCRIPTION OF THE DRAWINGS

FIG. 1 is a partially sectioned, simplified side elevational view of a notebook computer having a collapsible keyboard structure embodying principles of the present invention, the computer being in an opened orientation and the keyboard key members being in a resiliently preloaded, outwardly extended ready-to-use orientation;

FIG. 2 is a view similar to that in FIG. 1, but with the computer in its closed orientation and the collapsible keyboard structure being in its key-retracted storage and transport orientation;

FIGS. 3A and 3B are enlarged scale cross-sectional detail views of the circled area "3" in FIG. 1 with the keyboard key cap members respectively in their preloaded use orientations and their retracted storage and transport orientations;

DETAILED DESCRIPTION

Figure 4:
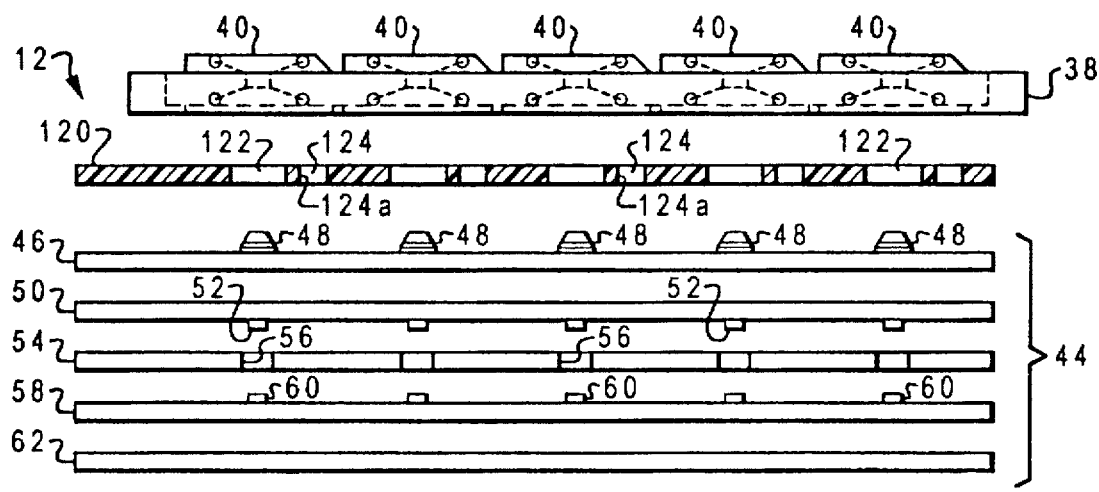
FIG. 4 is a highly schematic exploded side elevational view of the keyboard structure.

Referring initially to FIGS. 1 and 2, the present invention provides a portable computer, illustratively a notebook computer 10, having incorporated therein a specially designed collapsible keyboard structure 12 embodying principles of the present invention. Computer 10 includes a hollow rectangular base housing 14 having a top horizontal side wall 16 with an opening 18 therein; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint 34 to a top rear corner portion of the base housing 14. Lid housing 30 may be upwardly pivoted to place the computer 10 in an open use orientation (FIG. 1) in which the top side 16 of the base housing 14 is exposed and the display screen 32 forwardly faces the user of the computer, or downwardly pivoted to place the computer 10 in a closed storage and transport orientation (FIG. 2) in which the lid housing extends across and covers the top side of the base housing 14. Suitable latch means (not shown) are provided to releasably retain the lid housing 30 in its FIG. 2 closed orientation.

The collapsible keyboard structure 12 extends across the opening 18 in the top side wall 16 of the base housing 14 and occupies only a relatively small upper portion of the interior 36 of the base housing. Referring now to FIGS. 1, 2 and 4, the keyboard structure basically comprises a relatively thin rectangular monoblock support structure 38 that horizontally extends across the base housing trop side opening 18 and is suitably anchored to the base housing 14; a series of manually depressible key cap members 40 carried for vertical movement relative to the support structure 38 (as indicated by the arrows 42 in FIG. 1); a rectangularly configured, multilayer signal pad structure 44 that underlies the support structure 38 and is transverse to the keystroke directions 42; and a horizontally shiftable preload sheet 120 which is interposed between the top side of the multilayer signal pad structure 44 and the bottom side of the support structure 38.

The signal pad structure 44, which is of a generally conventional construction, is shown in simplified exploded form in FIG. 4 and includes, from top to bottom, (1) a plastic dome sheet 46 having a spaced series of rubber key return domes 48 projecting upwardly from its top side; (2) a plastic top circuit sheet 50 having a spaced series of circular, electrically conductive pads 52 disposed on its bottom side, aligned with the domes 48, and connected to surface trace circuitry (not shown) formed on the sheet 50; (3) a plastic spacer sheet 54 having a spaced series of circular openings 56 formed therein and underlying the pads 52; (4) a plastic bottom circuit sheet 58 having a spaced series of circular, electrically conductive pads 60 disposed on its top side, aligned with the sheet openings 56, and connected to surface trace circuitry (not shown) formed on the sheet 58; and (5) a metal backing sheet 62.

The five sheet members 46, 50, 54, 58, 62 are suitably held in their indicated stacked orientation to combinatively define the overall signal pad structure. As illustrated in FIGS. 1-3B, the signal pad structure 44, and the plastic preload sheet 120 that slidingly overlies it, have opposite side edge portions that are slidably retained between two sets of horizontal rail member pairs 64, 66 formed on the interior sides of the base housing side walls 26 and 28. For purposes later described herein, the rail member pairs 64, 66 support the signal pad structure 44 and preload sheet 120 for horizontal front-to-rear movement relative to the base housing 14, and thus relative to the keyboard support structure 38, between a first position (FIGS. 1 and 3A) in which the left or rear side edges of the signal pad structure 44 and the preload sheet 120 abut a pair of stop projections 68 formed on the inner sides of the base housing side walls 26 and 28, and a second position (FIGS. 2 and 3B) in which the signal pad structure 44 and the preload sheet 120 are forwardly shifted away from the stop projections 68.

With the computer lid housing 30 in its FIG. 1 open position, a plurality of schematically depicted compression spring members 70, interposed between the right or front edge of the signal pad structure 44 and the front base housing end wall 22, resiliently hold the signal pad structure 44 in its first position. However, as the lid housing 30 is subsequently closed, a spaced pair of tapered cam projections 72 disposed on the front or inner side of the lid housing 30 engage the rear side edge of the signal pad structure 44 and drive it to its second position (FIG. 2) against the resilient resistance force of the spring members 70. When the lid housing 30 is opened again, the cam projections 72 are lifted out of engagement with the signal pad structure 44 to thereby permit the spring members 70 to drive the signal pad structure 44, and the overlying preload sheet 120, back to their FIG. 1 first positions.

In a manner subsequently described herein this selective shifting of the signal pad structure 44 relative to the keyboard support structure 38 is operative to automatically shift the key cap members 40 between a FIG. 3A elevated, resiliently preloaded solid line operating orientation (when the signal pad structure 44 is in its leftwardly shifted first position), and a FIG. 3B retracted storage and transport orientation (when the signal pad structure 44 is in its rightwardly shifted second position).

Turning now to FIGS. 3A, 3B, 5A and 5B, each of the key cap members 40 has a hollow, rectangular molded plastic body with a top side wall 74 having a downwardly and forwardly sloping front edge portion 76, an open bottom side 78. A scissored linkage assembly 80 is secured to the bottom of each of the key cap members 40 and includes a first pair of scissor arms 82 and a second pair of scissor arms 84, with longitudinally intermediate portions of the arms 82 being pivotally connected to longitudinally intermediate portions of the arms 84 as indicated.

First ends of the arms 82 are joined by a cylindrical rod 86 pivotally anchored in tabs 88 projecting downwardly from the top key member wall 74, while the opposite ends of the arms 82 have outwardly projecting cylindrical pins 90 formed thereon and slidingly received in a slot 92 formed in the bottom side of the support structure 38. For purposes later described herein, each of the pins 90 has a downwardly projecting transverse boss portion 90a formed thereon. First ends of the arms 84 are joined by a cylindrical rod 94 having its opposite ends pivotally anchored in tabs 96 on the bottom side of the support structure 38, while the opposite ends of the arms 84 have outwardly projecting cylindrical pins 98 slidingly received in slots 100 formed on the underside of the key cap member 40.

Longitudinally intermediate portions of the scissor arms 84 are interconnected by a joining plate structure 102 having, on its underside, a bottom bearing surface 104, and a forwardly facing cam surface 106 extending at an angle to the bearing surface 104. The scissored linkage assembly 80 is movable relative to its associated key cap member 40 between an extended position shown in FIG. 5A (and in phantom in FIG. 3A), and a retracted position shown in FIGS. 3B and 5B.

Referring now to FIGS. 3A and 3B, with the lid housing 30 opened, the signal pad structure 44 is leftwardly driven to its FIG. 3A position (by the spring members 70 schematically shown in FIG. 1), and the key cap members 40 are in their FIG. 3A upwardly shifted solid line preloaded use orientations in which the scissored linkage assemblies 80 are upwardly extended, with the bearing surfaces 104 of the linkage assemblies 80 overlying, downwardly engaging, and slightly compressing the resilient key return domes 48.

When any of the key cap members 40 is manually depressed, against the resilient resistance of its associated return dome 48, the dome is downwardly deformed to cause an internal projection 108 therein to be downwardly pressed against a portion of the dome sheet 46 underlying the projection 108. This, in turn, causes the contact pad pair 52, 60 underlying the projection 108 to be brought into engagement with one another and cause their associated circuitry to output an electrical signal indicative of the striking of their associated key cap member. When the key cap member is released from its manually depressed orientation, it is automatically returned upwardly to its FIG. 3A position by the resilient force of its underlying key return dome 48 which functions as a return spring means.

When the signal pad structure 44 is forwardly shifted from its FIG. 3A position to its FIG. 3B position, in response to closing the lid housing 30 as previously described, the key return domes 48 are forwardly moved out from under their associated scissor linkage bearing surfaces 104, and the scissored linkage assemblies 80 are forcibly driven to their retracted FIG. 3B positions. This, in turn, downwardly drives the key cap members 40 to their FIG. 3B retracted positions, thereby reducing the overall thickness of the collapsible keyboard structure 12 by approximately the vertical stroke distance of the key cap members 40.

The forcible retraction of the key cap members 40 is effected by a spaced series of upward projections 110 formed on the top side of the dome sheet 46. Pairs of the projections 110 are positioned on opposite sides of the domes 48 and located immediately behind the opposite ends of the scissor arm pins 90. When the signal pad structure 44 is rightwardly driven away from its FIG. 3A position the projections 110 rightwardly engage and drive the pins 90 to thereby forcibly move the scissored linkage assemblies 80 from their FIG. 3A upwardly shifted positions to their retracted FIG. 3B positions. Alternatively, the projections 110 could be omitted and the key cap members 40 permitted to fall by gravity to their retracted FIG. 3B positions when the signal pad structure 44 is rightwardly driven from its FIG. 3A position to its FIG. 3B position.

When the lid housing 30 is opened again, the resulting leftward or rearward driven movement of the signal pad structure 44 causes the sloping rear side surfaces of the key return domes 48 to rearwardly engage the forwardly and upwardly sloped cam surfaces 106 of the linkage assemblies 80 in a manner forcing the linkage assemblies 80 upwardly back to their FIG. 3A positions in which the upper ends of the domes 48 underlie and engage the linkage assembly bearing surfaces 104 to thereby return the key cap members 40 to their upwardly shifted use orientations.

As previously mentioned, with the key cap members 40 in their FIG. 3A resiliently preloaded solid line operating orientations, each of the key cap members 40 slightly compresses its underlying elastomeric dome member 48 while the key cap member awaits a manual depression thereof through an operating stroke to bring it to its FIG. 3B retracted position. The resilient preload maintained on the key cap members 40 in their ready-to-use FIG. 3A solid line operating orientations advantageously restrains the key cap members 40 against rattling and wobbling during use. The scissor linkage 80 associated with each key cap member 40 permits the key cap member 40 to be moved upwardly relative to the monoblock support structure 38 to a dotted line fully extended position as shown in FIG. 3A, such fully extended position being slightly above the solid line key cap preloaded operating orientation by a small representative distance D. With the key cap member 40 in this fully extended dotted line position, its associated dome member 48 may be brought to an underlying relationship with the scissor linkage joining structure 102 without creating an interference fit between the dome member 48 and the joining structure 102 and a corresponding vertical compression of the dome member 48.

In a manner which will now be described, the preload sheet 120 is used to downwardly shift each key cap member 40 from its FIG. 3A dotted line fully extended position to its FIG. 3A solid line resiliently preloaded operating position during a small terminal portion of the overall right-to-left key elevation stroke of the signal pad structure 44 from its FIG. 3B position to its FIG. 3A position. More specifically, as the signal pad structure 44 and the preload sheet 120 are leftwardly moved from their FIG. 3B positions toward their FIG. 3A positions, the dome members 48 move under their overlying scissor linkage portions 102 and cam them upwardly to move the scissor linkages to their fully extended positions.

In a manner later described herein, as the signal pad structure 44 and the overlying preload sheet 120 closely approach the stop projections 68, the preload sheet 120 is shifted in a reverse direction (i.e., to the right as viewed in FIG. 3A) and functions to forcibly retract the fully elevated key cap members 40 from their fully elevated dotted line FIG. 3A positions downwardly through the distance D to their solid line FIG. 3A resiliently preloaded operating positions. In such solid line key cap member positions there is an interference preload fit between the linkage portions 102 and their underlying dome members 48 which, as stated previously, slightly compresses the dome members 48.

However, this interference fit that slightly compresses the dome members 48 is not created until during a small terminal portion of the elevating stroke of the signal pad structure 44 and the preload sheet 120. Accordingly, during a substantial initial portion of such elevating stroke the sliding frictional force on the dome sheet 46 is not substantially increased by any resilient preload forces transmitted to the key cap members. Instead, this preload force, and the resulting increased sliding frictional force exerted on the dome sheet 46, is created only during a relatively small end portion of the elevation stroke of the signal pad structure 44, and during a small initial portion of the subsequent rightward retraction stroke of the signal pad structure.

Figure 6A:
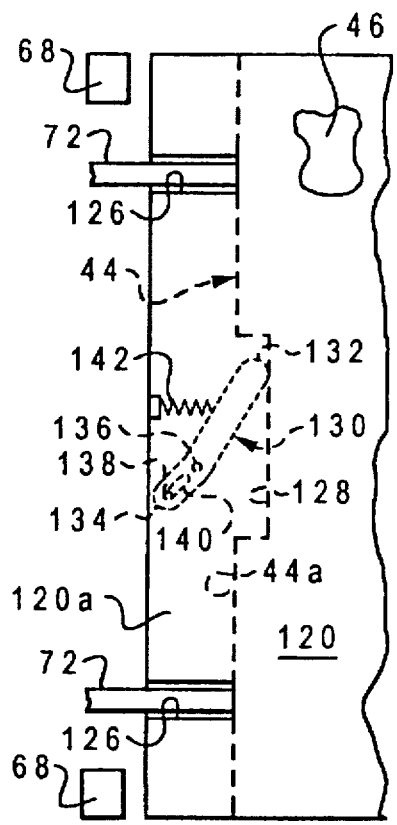
FIG. 6A is a simplified top plan view, taken generally along line 6A—6A of FIG. 3B, of a portion of a preload sheet incorporated in the keyboard structure.
Figure 6B:
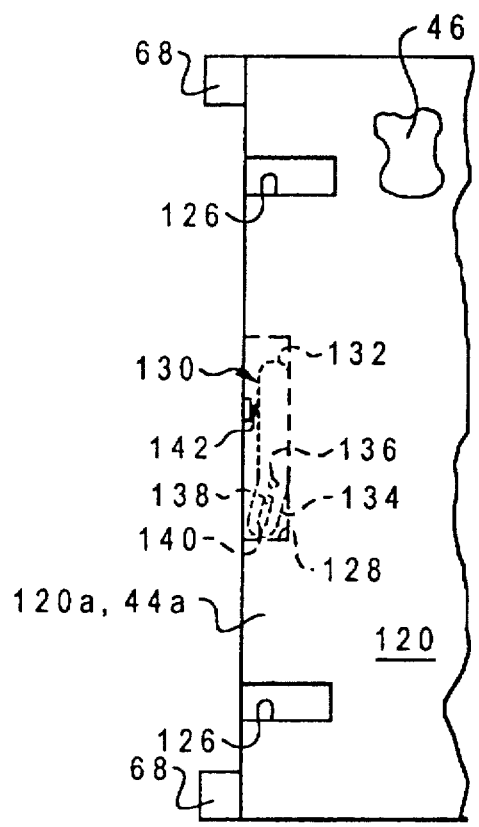
FIG. 6B is a simplified top plan view of a portion of the preload sheet taken generally along line 6B—6B of FIG. 3A.
Figure 5A:
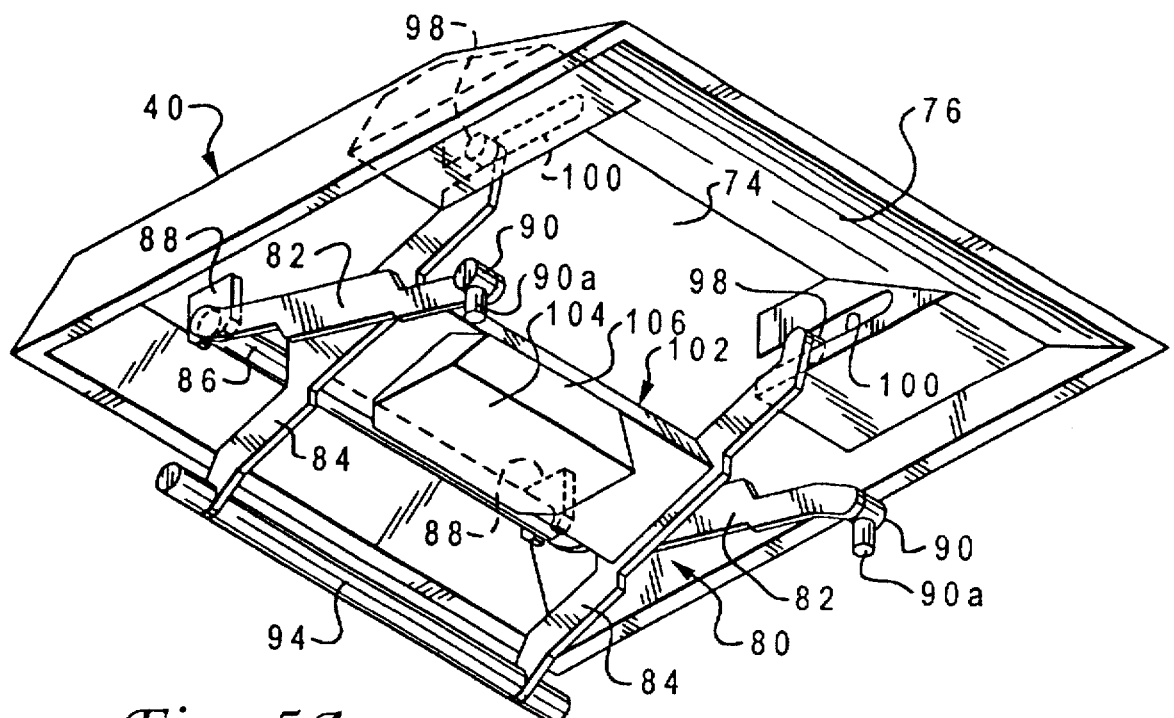
FIGS. 5A and 5B are enlarged scale bottom side perspective views of a key cap member respectively illustrating a scissored support portion thereof in its extended and retracted positions.
Figure 5B:
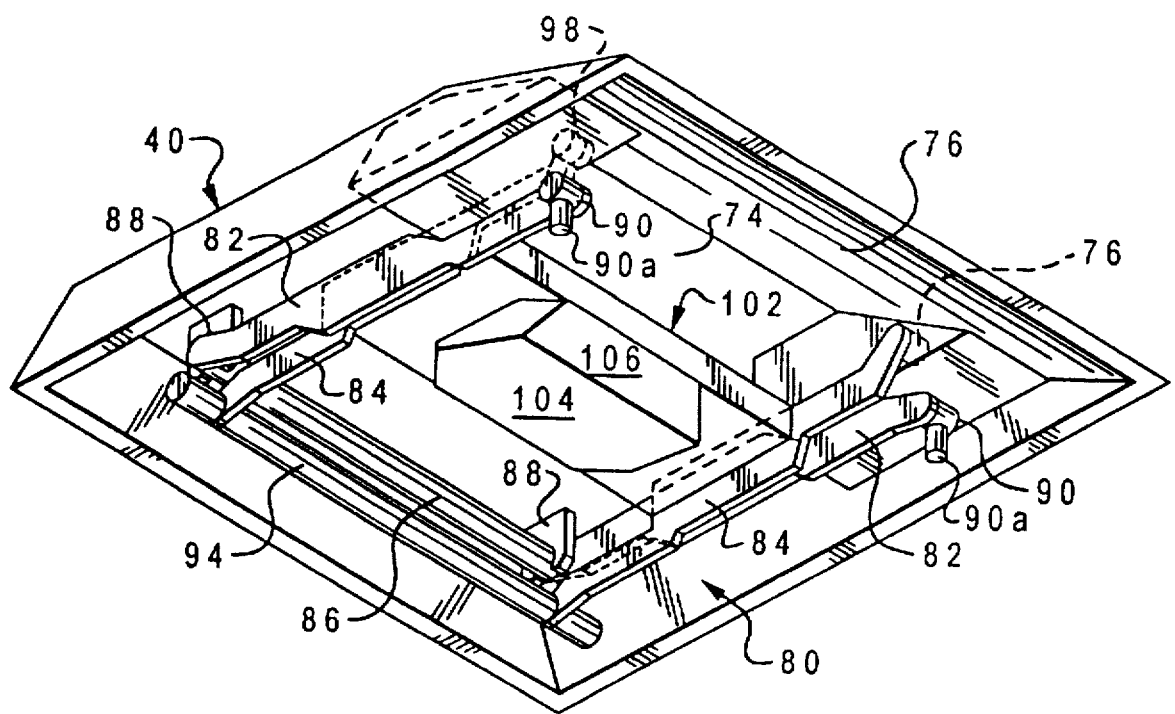

Turning now to FIGS. 3A–4, 6A and 6B, the plastic preload sheet 120 has a rear edge 120a, a spaced series of openings 122 through which the key return domes 48 upwardly project, and a spaced series of openings 124 through which the scissor linkage pin bosses 90a downwardly project as may be best seen in FIGS. 3A and 3B. The openings 124 have rear side edges 124a. As best shown in FIGS. 6A and 6B, a spaced pair of rectangular notches 126 are formed in the rear side edge 120a of the preload sheet 120 and are positioned to receive the tapered cam members 72 as later described, and a centrally disposed rectangular notch 128 is formed in the rear side edge 44a of the signal pad structure 44 and is positioned horizontally between the notches 126.

An elongated bent pivot plate member 130 has opposite long and short end portions 132, 134 and is pivotally connected, as at 136, to the underside of a rear portion of the preload sheet 120 in a facing relationship with the signal pad structure notch 128. A drive pin 138 extends downwardly from the underside of the preload sheet 120 and is slidingly received in a lost motion slot 140 formed in the short end portion 134 of the pivot plate member 130. The pivot plate member 130 is rotationally biased in a clockwise direction as viewed in FIGS. 6A and 6B by a schematically depicted compression spring structure 142 rightwardly bearing against the long end portion 132 of the pivot plate member 130.

When the key cap members 40 are in their FIG. 3B retracted storage and transport orientations, and the lid housing 30 is closed, the tapered cam members 72 are received in the preload sheet edge notches 126 (see FIG. 6A) and bear against the rear side edge 44a of the signal pad structure 44, with the rear side edge 120a of the preload sheet 120 being rearwardly offset from the rear edge 44a of the signal pad structure 44. The pivot plate 130 is in its FIG. 6A position, with the outer end of the long end portion 132 of the pivot plate engaging the inner side surface of the signal pad notch 128.

When the computer lid housing 30 is lifted, the tapered cam members 72 are lifted out of engagement with the signal pad 44 and the springs 72 (see FIG. 1) leftwardly drive the signal pad structure 44 leftwardly through its key elevation stroke. During an initial portion of this elevation stroke, the leftwardly moving key return domes 48 cammingly elevate the key cap members 40 to their fully elevated FIG. 3A dotted line positions as the rear side edge 120a of the leftwardly moving preload sheet 120 (see FIG. 6A) approaches the stop projections 68.

As the indicated portions of the rear preload sheet edge 120 engage the stop projections 68, the inner side portion of the leftwardly moving signal pad notch 128 exerts a leftward force on the long portion 132 of the pivot plate 130 and forcibly rotates the plate 130 in a counterclockwise direction, thereby creating a mechanically advantaged rightwardly directed force on the preload sheet 120. This aids in rightwardly shifting the preload sheet relative to the underlying dome sheet 46 through a preload stroke until, as indicated in FIG. 6B, the rear side edges 120a, 44a of the preload sheet are both in engagement with the stop projections 68 and the plate 130 is pivoted to its final FIG. 6B position.

The rightward shifting of the preload sheet 120 relative to the underlying dome sheet 46 causes the rear edges 124a of the preload sheet openings 124 to engage and rightwardly drive the scissor linkage pin boss portions 90a a small distance rightwardly from their positions attained when the key cap members 40 are fully elevated to their FIG. 3A dotted line positions. This force rightward movement of the pin bosses 90a relative to the pin portions 94 drives the key cap members 40 down to their FIG. 3A solid line positions in which the linkage portions 102 slightly compress the domes 48 and maintain a resilient operating preload force on the key cap members 40 and their linkages 80 to substantially preclude rattling and wobbling of the keys during their use.

When the computer lid housing 30 is again closed, the tapered cam members 72 again engage the rear edge 44a of the signal pad structure 44, at the slot areas 126 of the overlying preload sheet 120, and force the signal pad structure 44 and the preload sheet 120 back to their positions shown in FIGS. 3B and 6A. As previously described, this automatically retracts the key cap members 40 to their FIG. 3B positions. After a small initial portion of this retraction stroke of the signal pad structure 44 and the preload sheet 120, the preload sheet 120 (aided by the spring 142) leftwardly returns to its FIG. 6A position, thereby releasing the preload compression on the dome members 48 and reducing the sliding friction force on the dome sheet 46 during the remainder of the retraction stroke of the signal pad structure 44 and the preload sheet 120.

From the foregoing it can be seen that the collapsible keyboard structure 12 of the present invention effectively reduces the thickness of the keyboard structure in its FIG. 3B storage/transport orientation essentially by the operative stroke distance of the key cap members 40, and automatically brings the keyboard structure to this orientation in response to the closure of the lid housing 30. Accordingly, the operative key stroke distance does not have to be undesirably reduced (compared to the corresponding key stroke distance of a desktop computer keyboard) to reduce the storage/transport thickness of the keyboard structure 12.

While the keyboard structure 12 has been representatively depicted as having the keyboard support structure 38 fixedly secured to the base housing 14, with the signal pad structure 44 being shiftable relative to the support structure 38, it will be appreciated that, alternatively, the keyboard support structure 38 could be shifted relative to the signal pad structure 44 if desired. Moreover, while the entire signal pad structure 44 has been illustrated as being shiftable relative to the support structure 38, it will be readily appreciated that the dome sheet 46 could by itself be shifted relative to the support structure 38 and the balance of the signal pad structure 44 if desired.

Additionally, while the key structures 40 have been representatively illustrated as being supported on the keyboard carrying structure 38 using scissored linkage assemblies, other means of supporting the key cap members 40 for vertical movement could be utilized if desired. Moreover, spring return means other than the rubber key return domes 48 could be provided for forward and rearward shifting relative to the key cap members if desired.

The foregoing detailed description is to be clearly understood as being given by way of illustration and example only, the spirit and scope of the present invention being limited solely by the appended claims.

What is claimed is:

1. Collapsible keyboard apparatus comprising:
   a support structure;
   a series of key structures carried on said support structure for movement relative thereto between extended and retracted positions; and
   a key shifting and preload structure operative to move said key structures from said retracted positions to said extended positions, partially retract said key structures from said extended positions to operating positions from which said key structures may be manually depressed to said retracted positions, restrain the partially retracted key structures against movement thereof to said extended positions, and exert on the restrained key structures a preload force resiliently urging them toward said extended positions.

2. The collapsible keyboard apparatus of claim 1 wherein said collapsible keyboard apparatus is a portable computer keyboard.

3. The collapsible keyboard apparatus of claim 2 wherein said portable computer keyboard is a notebook computer keyboard.

4. Collapsible keyboard apparatus comprising:
   a support structure;
   a series of key structures carried on said support structure for movement relative thereto between extended and retracted positions; and
   key positioning means, including a series of resilient key return members and being supported in a manner permitting a relative shifting between said support structure and said key positioning means through an elevation stroke, for sequentially:
   (1) causing said key return members to engage said key structures and move them from said retracted positions to said extended positions in response to a relative shifting between said support structure and said key positioning means through an initial portion of said elevation stroke, and
   (2) partially retracting said key structures from said extended positions to resiliently preloaded operating positions, in which said key structures partially compress said resilient key return members, in response to a relative shifting between said support structure and said key positioning means through a final portion of said elevation stroke.

5. The collapsible keyboard apparatus of claim 4 wherein said collapsible keyboard apparatus is a portable computer keyboard.

6. The collapsible keyboard apparatus of claim 5 wherein said portable computer keyboard is a notebook computer keyboard.

7. The collapsible keyboard apparatus of claim 4 wherein said key positioning means include:
   a shifting member upon which said key return members are carried, and
   a preload member carried by said shifting member for movement relative thereto, during said final portion of said elevation stroke, through a preload stroke in which said preload member engages said key return members and partially retracts them from said extended positions thereof to said resiliently preloaded operating positions thereof.

8. The collapsible keyboard apparatus of claim 7 wherein:

said shifting member is movable through said elevation stroke in a first direction relative to said support structure, and said preload member is movable through said preload stroke relative to said shifting member in a second direction opposite to said first direction.

9. The collapsible keyboard apparatus of claim 7 wherein:

said shifting member is a first sheet member underlying said support structure and having a top side facing said support structure, said resilient key return members are carried on said top side of said first sheet member, and said preload member is a second sheet member slidingly sandwiched between said first sheet member and said support structure.

10. The collapsible keyboard apparatus of claim 9 wherein:

said key structures include key cap members, and extendable and retractable linkage structures supporting said key cap members on said support structure, and said second sheet member has a spaced series of first openings through which said resilient key return members upwardly project, and a spaced series of second openings with edge surfaces positioned to engage portions of said linkage structure and partially retract them during movement of said second sheet member through said preload stroke.

11. The collapsible keyboard apparatus of claim 10 wherein:

said linkage structures are scissored linkage structures, and said resilient key return members are elastomeric dome members.

12. The portable computer of claim 8 wherein said key positioning means further include a stop structure carried in said base housing and operative to abut said preload member during said final portion of said elevation stroke.

13. For use in conjunction with a collapsible keyboard having a series of key structures movable between extended and retracted positions, a method of readying the keyboard for use when the key structures are in their retracted positions, said method comprising the steps of:

moving the key structures from their retracted positions to their extended positions;

partially retracting the key structures from their extended positions to operating positions from which the key structures may be depressed to their retracted positions;

restraining the partially retracted key structures against movement thereof to their extended positions; and exerting on the restrained key structures a preload force that resiliently urges them toward their extended positions.

14. The method of claim 13 wherein said moving step is performed by moving resilient key return members under the retracted key structures in a manner causing the key return members to engage the key structures and move them to their extended positions.

15. The method of claim 14 wherein:

said key structures include key cap members mounted on extendable and retractable linkage structures, said partially retracting and restraining steps are performed by creating and maintaining a retraction force on the linkage structures, and said exerting step is performed by causing the key cap members to partially compress the resilient key return members.

16. A portable computer comprising:

a base housing; and a collapsible keyboard carried on said base housing and including:

a support structure, a series of key structures carried on said support structure for movement relative thereto between extended and retracted positions, and a key shifting and preload structure operative to move said key structures from said retracted positions to said extended positions, partially retract said key structures from said extended positions to operating positions from which said key structures may be manually depressed to said retracted positions, restrain the partially retracted key structures against movement thereof to said extended positions, and exert on the restrained key structures a preload force resiliently urging them toward said extended positions.

17. The portable computer of claim 16 wherein said computer is a notebook computer.

18. The portable computer of claim 16 wherein:

said base housing has a lid housing secured thereto for pivotal movement between open and closed positions, and said key shifting and preload structure is operative in response to moving said lid housing from said closed position thereof to said open position thereof.

19. A portable computer comprising:

a base housing; and a collapsible keyboard carried on said base housing and including:

a support structure;

a series of key structures carried on said support structure for movement relative thereto between extended and retracted positions; and key positioning means, including a series of resilient key return members and being supported in a manner permitting a relative shifting between said support structure and said key positioning means through an elevation stroke, for sequentially:

(1) causing said key return members to engage said key structures and move them from said retracted positions to said extended positions in response to a relative shifting between said support structure and said key positioning means through an initial portion of said elevation stroke, and (2) partially retracting said key structures from said extended positions to resiliently preloaded operating positions, in which said key structures partially compress said resilient key return members, in response to a relative shifting between said support structure and said key positioning means through a final portion of said elevation stroke.

20. The portable computer of claim 19 wherein said portable computer is a notebook computer.

21. The portable computer of claim 19 wherein:

said portable computer further comprises a lid housing secured to said base housing for pivotal movement relative thereto between an open position and a closed position, and said key positioning means are operative in response to moving said lid housing from said closed position thereof to said open position thereof.

22. The portable computer of claim 19 wherein said key positioning means include:

a shifting member upon which said key return members are carried, and a preload member carried by said shifting member for movement relative thereto, during said final portion of said elevation stroke, through a preload stroke in which said preload member engages said key return members and partially retracts them from said extended positions thereof to said resiliently preloaded operating positions thereof.

23. The portable computer of claim 22 wherein:

said shifting member is movable through said elevation stroke in a first direction relative to said support structure, and said preload member is movable through said preload stroke relative to said shifting member in a second direction opposite to said first direction.

24. The portable computer of claim 22 wherein:

said shifting member is a first sheet member underlying said support structure and having a top side facing said support structure, said resilient key return members are carried on said top side of said first sheet member, and said preload member is a second sheet member slidingly sandwiched between said first sheet member and said support structure.

25. The portable computer of claim 24 wherein:

said key structures include key cap members, and extendable and retractable linkage structures supporting said key cap members on said support structure, and said second sheet member has a spaced series of first openings through which said resilient key return members upwardly project, and a spaced series of second openings with edge surfaces positioned to engage portions of said linkage structure and partially retract them during movement of said second sheet member through said preload stroke.

26. The portable computer of claim 25 wherein:

said linkage structures are scissored linkage structures, and said resilient key return members are elastomeric dome members.

27. The portable computer of claim 12 wherein said key positioning means further include:

a spring structure operative to move said shifting member through said elevation stroke, and cooperating means on said shifting member and said preload member for exerting a mechanically advantaged force on said preload member, to move said preload member through said preload stroke, in response to said preload member being forced against said stop structure by said spring structure.

28. The portable computer of claim 27 wherein said cooperating means include:

a surface portion of said shifting member, and a lever member pivotally carried by said preload member and operatively engageable by said shifting member surface portion during said final portion of said elevation stroke.

* * * * *